(12) United States Patent
Kim

(10) Patent No.: US 9,921,387 B2
(45) Date of Patent: *Mar. 20, 2018

(54) LENS DRIVING APPARATUS

(71) Applicant: LG INNOTEK CO., LTD., Seoul (KR)

(72) Inventor: Ji Hoon Kim, Gunpo-si (KR)

(73) Assignee: LG INNOTEK CO., LTD., Seoul (KR)

( * ) Notice: Subject to any disclaimer, the term of this patent is extended or adjusted under 35 U.S.C. 154(b) by 154 days.

This patent is subject to a terminal disclaimer.

(21) Appl. No.: 14/473,771

(22) Filed: Aug. 29, 2014

(65) Prior Publication Data

US 2014/0368934 A1 Dec. 18, 2014

Related U.S. Application Data

(63) Continuation of application No. 13/873,978, filed on Apr. 30, 2013, which is a continuation of application (Continued)

(30) Foreign Application Priority Data

Nov. 23, 2006 (KR) .................. 10-2006-0116317

(51) Int. Cl.
G02B 7/02 (2006.01)
G03B 3/10 (2006.01)
(Continued)

(52) U.S. Cl.
CPC .......... *G02B 7/023* (2013.01); *G02B 27/0006* (2013.01); *G03B 3/10* (2013.01);
(Continued)

(58) Field of Classification Search
CPC .. G02B 7/023; G02B 27/0006; G11B 7/0933; G11B 7/0935; H02K 41/0356; G03B 3/10
See application file for complete search history.

(56) References Cited

U.S. PATENT DOCUMENTS 5,177,640 A 1/1993 Grassens
6,856,469 B2 2/2005 Yoneyama et al.
(Continued)

FOREIGN PATENT DOCUMENTS

CN 1763623 A 4/2006
CN 1831576 A 9/2006
(Continued)

OTHER PUBLICATIONS

Office Action dated Dec. 29, 2014 in Korean Application No. 10-2014-0105248.
(Continued)

*Primary Examiner* — Alicia M Harrington
(74) *Attorney, Agent, or Firm* — Saliwanchik, Lloyd & Eisenschenk

(57) ABSTRACT

Disclosed is a lens driving apparatus. The lens driving apparatus includes a base, a yoke coupled to the base, having an upper surface formed with a hole, a closed side surface, and an opened bottom surface, a bobbin movably installed in an inner portion of the yoke, a lens module coupled to the bobbin to go in and out the hole according to movement of the bobbin, a magnet fixed to an inner portion of the yoke, a coil fixed to an outer portion of the bobbin while facing the magnets, and springs coupled to the bobbin to provide restoration force to the bobbin.

20 Claims, 2 Drawing Sheets

Related U.S. Application Data

No. 12/910,293, filed on Oct. 22, 2010, now Pat. No. 8,451,553, which is a continuation of application No. 12/516,146, filed as application No. PCT/KR2007/005901 on Nov. 22, 2007, now Pat. No. 7,885,023.

(51) Int. Cl.
  *G11B 7/09* (2006.01)
  *H02K 41/035* (2006.01)
  *G02B 27/00* (2006.01)

(52) U.S. Cl.
  CPC .......... *G11B 7/0933* (2013.01); *G11B 7/0935* (2013.01); *H02K 41/0356* (2013.01)

(56) References Cited

U.S. PATENT DOCUMENTS

| | | | |
|---|---|---|---|
| 7,298,562 B2 | 11/2007 | Sue et al. | |
| 7,394,603 B2 | 7/2008 | Shiraki | |
| 7,400,068 B2 | 7/2008 | Tseng | |
| 7,649,703 B2 | 1/2010 | Shiraki et al. | |
| 7,916,412 B2 | 3/2011 | Li et al. | |
| 8,451,553 B2 | 5/2013 | Kim | |
| 2006/0028320 A1* | 2/2006 | Osaka | G02B 7/08 340/384.1 |
| 2006/0034599 A1 | 2/2006 | Osaka | |
| 2006/0181632 A1 | 8/2006 | Makii et al. | |
| 2007/0091199 A1 | 4/2007 | Shiraki et al. | |
| 2007/0110424 A1 | 5/2007 | Iijima et al. | |
| 2007/0133110 A1 | 6/2007 | Huang | |
| 2008/0055752 A1 | 3/2008 | Ishizawa et al. | |
| 2008/0117536 A1 | 5/2008 | Higuchi | |

FOREIGN PATENT DOCUMENTS

| | | |
|---|---|---|
| DE | 20-2006-009115 U1 | 8/2006 |
| EP | 1698925 A1 | 9/2006 |
| EP | 1970741 A1 | 9/2008 |
| JP | 2003-005014 A | 1/2003 |
| JP | 2003149537 A | 5/2003 |
| JP | 2005-173431 A | 6/2005 |
| JP | 2005-234404 A | 9/2005 |
| JP | 2006-047342 A | 2/2006 |
| JP | 2006-074990 | 3/2006 |
| JP | 2006-259032 A | 9/2006 |
| KR | 10-1999-0009117 A | 2/1999 |
| KR | 20-0370323 | 12/2004 |
| KR | 10-2005-0029700 A | 3/2005 |
| KR | 10-2005-0082413 A | 8/2005 |
| KR | 10-2005-0093111 A | 9/2005 |
| KR | 10-0548869 B1 | 1/2006 |
| KR | 10-2006-0023760 A | 3/2006 |
| KR | 10-2006-0084130 A | 7/2006 |
| KR | 10-2008-0046819 A | 5/2008 |
| TW | 200525859 A | 8/2005 |
| TW | M285846 U | 1/2006 |
| TW | M290574 U | 5/2006 |
| TW | 265668 B | 11/2006 |

OTHER PUBLICATIONS

European Search Report dated Dec. 16, 2014 in European Application No. 14183960.5.
First Office Action dated Mar. 21, 2012 in Chinese Application No. 201110151745.4, filed Nov. 22, 2007.
Supplementary European Search Report dated Apr. 2, 2012 in European Application No. 07834206.0, filed Nov. 22, 2007.
Office Action dated Apr. 23, 2012 in Korean Application No. 10-2006-0116317, filed Nov. 23, 2006.
Office Action dated Apr. 20, 2012 in Korean Application No. 10-2010-0131070, filed Dec. 20, 2010.
Office Action dated Oct. 8, 2012 in Korean Application No. 10-2010-0131070, filed Dec. 20, 2010.
Office Action dated Apr. 18, 2014 in Korean Application No. 10-2013-0045730.
Office Action dated Nov. 5, 2015 in Taiwan Application No. 10421497700.
Office Action dated May 4, 2016 in Korean Application No. 10-2016-0023684, not translated.
Office Action dated Sep. 6, 2017 in Taiwanese Application No. 105136133, along with its English Translation.

* cited by examiner

[Fig. 1]
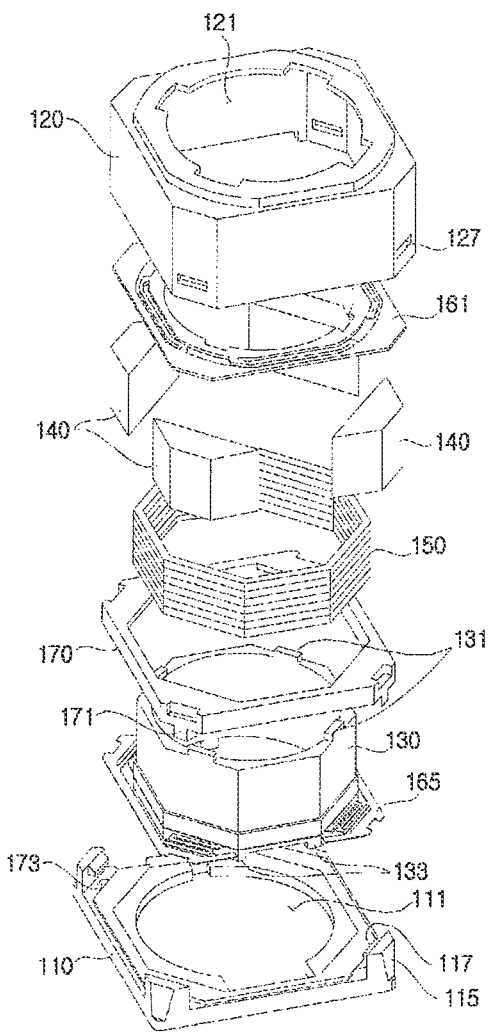
[Fig. 2]
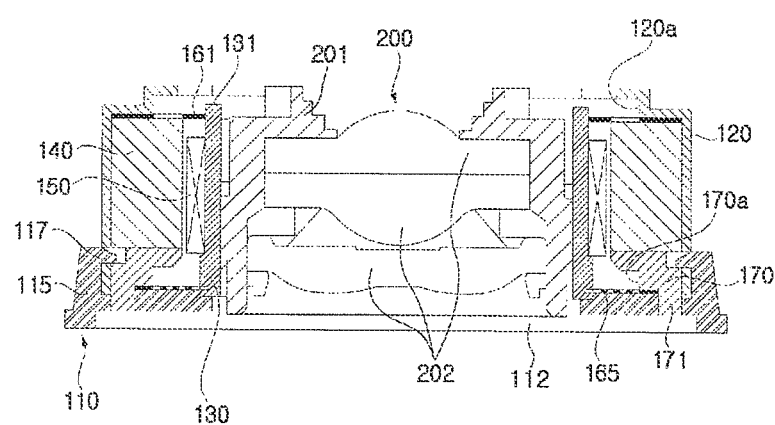

[Fig. 3]
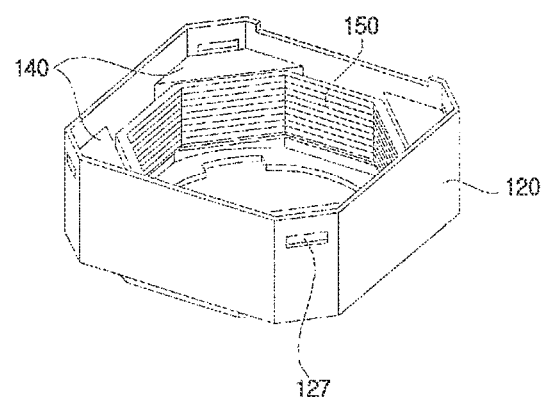
[Fig. 4]
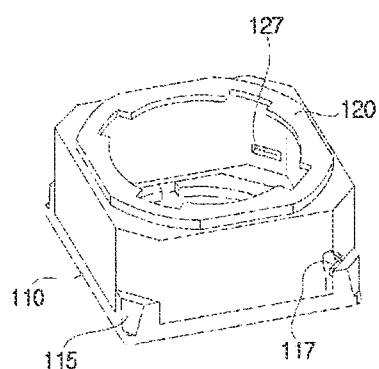

LENS DRIVING APPARATUS

CROSS-REFERENCE TO RELATED APPLICATIONS

This application is a continuation of U.S. application Ser. No. 13/873,978, filed Apr. 30, 2013; which is a continuation of U.S. application Ser. No. 12/910,293, filed Oct. 22, 2010, now U.S. Pat. No. 8,451,553, issued May 28, 2013; which is a continuation of U.S. application Ser. No. 12/516,146, filed May 22, 2009, now U.S. Pat. No. 7,885,023, issued Feb. 8, 2011; which is the U.S. national stage application of International Patent Application No. PCT/KR2007/005901, filed Nov. 22, 2007, which claims priority to Korean Patent Application No. 10-2006-0116317, filed Nov. 23, 2006, all of which are incorporated herein by reference in their entirety.

BACKGROUND

Technical Field

The present invention relates to a lens driving apparatus.

Background Art

Recently, as electronic appliances have multi-functions, various electronic appliances having cameras therein, such as MP3 players, mobile communication terminals and PDAs, have been widely used.

As electronic appliances having cameras therein are manufactured in a small size, parts for providing camera functions must also be manufactured in a small size.

Further, since electronic appliances having cameras therein may be easily exposed to external environment or impact in terms of the characteristics of portable electronic appliances, external impurities may easily penetrate into the electronic appliances or the electronic appliances may be easily broken by the impact.

BRIEF SUMMARY

Technical Problem

The embodiment provides a lens driving apparatus which can be designed in a simple structure and manufactured in a small size. The embodiment provides a lens driving apparatus having high resistance against impact and preventing penetration of external impurities.

Technical Solution

A lens driving apparatus according to an embodiment comprising: a base; a yoke coupled to the base, having an upper surface formed with a hole, a closed side surface, and an opened bottom surface; a bobbin movably installed in an inner portion of the yoke; a lens module coupled to the bobbin to go in and out the hole according to movement of the bobbin; a magnet fixed to an inner portion of the yoke; a coil fixed to an outer portion of the bobbin while facing the magnets; and springs coupled to the bobbin to provide restoration force to the bobbin.

Advantageous Effects

According to the lens driving apparatus of the embodiment, a yoke is directly coupled to a base and parts are installed in a space formed in an inner portion of the base and the yoke. Accordingly, since an additional case is not necessary, the number of parts is reduced, an assembly procedure is simplified, and thus the manufacturing cost can be saved. Further, according to the lens driving apparatus of the embodiment, the base is coupled to the yoke while maintaining a sealing status by locking holes of the base and locking protrusions of the yoke. That is, any gap does not exist in the sides of the base and the yoke, a hole of the yoke is shielded by a lens module, and a through hole of the base is closely coupled to an electronic appliance, so that impurities can be prevented from penetrating into the inner space formed be the base and the yoke. As a result, the parts are not damaged by the impurities. Furthermore, when a prism magnet is used, since the manufacturing cost is saved as compared with a case of using a ring-shaped magnet, the economical efficiency can be improved.

BRIEF DESCRIPTION OF THE DRAWINGS

FIG. 1 is an exploded perspective view showing a lens driving apparatus according to the embodiment;

FIG. 2 is a sectional view showing the lens driving apparatus in FIG. 1;

FIG. 3 is a perspective view showing a state in which a magnet and a coil stalled at the yoke in FIG. 1; and FIG. 4 is a perspective view shoving a coupling state of the yoke and the base in FIG. 1.

DETAILED DESCRIPTION

Mode of the Invention

Hereinafter, a lens driving apparatus according to an embodiment will be described with reference to accompanying drawings. FIG. 1 is an exploded perspective view showing the lens driving apparatus according to the embodiment, FIG. 2 is a sectional view showing the lens driving apparatus in FIG. 1, and FIG. 3 is a perspective view showing a state in which a magnet and a coil are installed at the yoke in FIG. 1.

As shown in FIGS. 1 and 2, the lens driving apparatus according to the embodiment comprises a base 110 and a metal yoke 120 which are coupled to each other to form a predetermined space.

The base 110 has a disc shape or a polygonal plate shape and is formed at the central portion thereof with a through hole 111. The bottom surface of the base 110 is coupled to an electronic appliance (not shown) and a circuit substrate 112 provided with an image sensor (not shown) is arranged in the through hole 111.

The yoke 120 is coupled to the base 110 to serve as a case for protecting parts. The yoke 120 has an upper surface, at which a hole 121 allowing entrance of a lens module 200 is formed, an opened bottom surface making contact with the upper surface of the base 110, and closed lateral side surfaces.

The side surfaces of the lens driving apparatus according to the embodiment are closed by the base 110 and the yoke 120. Accordingly, since an additional case for protecting the lens driving apparatus is not necessary, the structure of the lens driving apparatus can be simplified. Further, since the side surfaces of the lens driving apparatus are closed, external impurities cannot penetrate into the inner side of the lens driving apparatus.

A ring-shaped bobbin 130 that goes in and out the hole 121 is movably installed at the inner side of the yoke 120. The lens module 200 provided with a lens 202 and a support 201 for supporting the lens 202 is coupled to the inner peripheral surface of the bobbin 130.

The bobbin 130 includes an outer surface having a circular or a polygonal shape corresponding to the yoke 120, and an inner surface having a circular shape corresponding to the outer surface of the lens module 200. According to the embodiment, the bobbin 130 includes an outer surface having an octagonal shape.

Magnets 140 are fixed to the inner peripheral surface of the yoke 120, and a coil 150 is wound around the outer peripheral surface of the bobbin 130 while facing the magnets 140.

The magnet 140 has a circular or a polygonal shape corresponding to the yoke 120. As shown in FIGS. 1 and 3, when the yoke 120 is a polygonal case, a plurality of prism magnets 140 are prepared and three sides of each magnet 140 make contact with the inner peripheral surface of the yoke 120.

In the lens driving apparatus according to the embodiment, since the magnets 140 are installed at four edges of the yoke 120, respectively, an empty space between the yoke 120 and the coil 150 can be effectively utilized. Accordingly, the lens driving apparatus can be manufactured in a smaller size. Further, since the prism magnet 140 is inexpensive as compared with a ring-shaped magnet, the lens driving apparatus with a low price can be manufactured.

Since the coil 150 is wound around the outer peripheral surface of the bobbin 130, the coil 150 has a circular or a polygonal shape corresponding to the outer surface of the bobbin 130. If the coil 150 has a polygonal shape and the magnet 140 has a circular shape, the distance between the coil 150 and the magnet 140 becomes non-uniform.

Accordingly, when the coil 150 has a polygonal shape, the magnet 140 has a prism shape as shown in FIGS. 1 and 3.

As electric current is applied to the coil 150, the coil 150 moves upward according to the interaction of the electric field generated by the coil 150 and the magnetic field generated by the magnet 140, and thus the bobbin 130 moves upward. Accordingly, the lens module 200 coupled to the bobbin 130 also moves upward.

In addition, if the electric current is not applied to the coil 150, the bobbin 130 moves downward. To this end, upper and lower leaf springs 161 and 165 having a coil structure are installed at the upper and lower portions of the bobbin 130 in order to provide restoration force for returning the bobbin 130 to the initial state.

At this time, the outer portion of the upper spring 161 is inserted between the yoke 120 and the upper surface of the magnet 140. Further, the inner portion of the upper spring 161 is inserted into first support protrusions 131 formed on the upper end surface of the bobbin 130. Accordingly, the upper spring 161 can be prevented from being rotated and moved due to external impact.

The inner portion of the lower spring 165 is integrally formed with the bobbin 130 through injection molding, and the outer portion of the lower spring 165 is inserted between the bottom surface of a spacer 170 and the base 110. Further, second support protrusions 133 that make contact with the inner peripheral surface of the through hole 110 formed in the base 110 are formed on the lower end surface of the bobbin 130. The second support protrusions 133 guide and support the bobbin 130 such that the bobbin 130 can be coupled to another element at an exact position and exactly move upward and downward.

The spacer 170 is installed at the base 110 below the magnets 140 and the outer surface of the lower spring 165 is inserted between the lower surface of the spacer 170 and the base 110. That is, the outer portion of the lower spring 165 is supported between the spacer 170 and the base 110, and the inner portion of the lower spring 165 is integrally formed with the bobbin 130, so that the lower spring 165 can be prevented from being rotated and moved due to external impact.

Further, the spacer 170 has insertion protrusions 171 used for firm coupling and movement prevention of the spacer 170, and the base 110 has support holes 173 into which the insertion protrusions 171 are inserted.

The yoke 120 and the spacer 170 have step sections 120a and 170a, respectively, as shown in FIG. 2. the step sections 120a and 170a provide a space for movement of the middle parts of the upper and lower leaf springs 161 and 165.

Hereinafter, a coupling structure of the base 110 and the yoke 120 will be described with reference to FIGS. 1, 2 and 4.

FIG. 4 is a perspective view showing a coupling state of the yoke and the base in FIG. 1.

As shown in FIG. 4, the base 110 has a plurality of protrusion plates 115 protruding upward on the outer surface thereof, and locking protrusions 117 are formed at the protrusion plates 115, respectively. Further, the yoke 120 has locking holes 127 at the sides thereof, into which the locking protrusions 117 are inserted.

The base 110 is closely coupled to the yoke 120 by using the locking protrusions 117 and the locking holes 127.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The lens driving apparatus according to the embodiment can be manufactured in a small size, can prevent external impurities from penetrating into the inner portion of the lens driving apparatus, and is not broken due to external impact.

Further, the lens driving apparatus according to the embodiment can be applied to both cameras and various electronic appliances provided with the cameras.

What is claimed is:
1. A lens driving apparatus comprising:
   a base;
   a yoke disposed on the base, the yoke comprising a first side plate, a first upper plate extending from the first side plate, a second side plate extending upwardly from the first upper plate, and a second upper plate extending from the second side plate, wherein the second upper plate of the yoke comprises a hole;
   a bobbin disposed in the yoke;
   four magnets respectively disposed at corners of the yoke and coupled to the yoke;
   a coil wound around an outer peripheral surface of the bobbin while facing the four magnets; and
   springs coupled to the bobbin to provide restoration force to the bobbin;
   wherein the springs comprise an upper spring coupled to an upper portion of the bobbin and a lower spring coupled to a lower portion of the bobbin;
   wherein the upper spring is disposed in the yoke,
   wherein the upper spring comprises an inner side coupled to the upper portion of the bobbin, an outer side disposed between the first upper plate of the yoke and the four magnets at the corners of the yoke, and an intermediate portion connecting the inner side and the outer side;

wherein the outer side of the upper spring is interposed between the first upper plate of the yoke and the four magnets and is horizontally overlapped with the first side plate of the yoke and disposed inside the first side plate;

wherein the first side plate, the first upper plate, the second side plate, and the second upper plate are monolithically formed;

wherein, at each of the corners of the yoke, a bottom surface of the upper spring directly contacts a top surface of the respective magnet, and a top surface of the upper spring is vertically distanced from the second upper plate of the yoke;

wherein the outer side of the upper spring is vertically overlapped with a lower surface of the first upper plate of the yoke and coupled to the first upper plate of the yoke, and wherein the intermediate portion of the upper spring is vertically overlapped with the second upper plate of the yoke such that a gap is vertically provided between a top surface of the intermediate portion and a lower surface of the second upper plate of the yoke, and the intermediate portion of the upper spring is configured to be moved vertically in the gap.

2. The lens driving apparatus of claim 1, wherein the four magnets are coupled to an inner surface of the first side plate of the yoke.

3. The lens driving apparatus of claim 1, wherein the yoke is formed of metal, and the yoke is coupled to the base.

4. The lens driving apparatus of claim 1, wherein the base comprises locking protrusions and the yoke comprises locking holes at the side surface thereof to which the locking protrusions are coupled.

5. The lens driving apparatus of claim 1, wherein each of the four magnets comprises at least one flat surface facing the yoke.

6. The lens driving apparatus of claim 5, wherein each surface of the coil facing the four magnets is a flat surface.

7. The lens driving apparatus of claim 6, wherein each of the four magnets has a prism shape, and wherein the coil has a polygonal shape.

8. The lens driving apparatus of claim 1, wherein the coil comprises eight outer surfaces, and
wherein the four magnets face four outer surfaces of the eight outer surfaces of the coil, respectively.

9. The lens driving apparatus of claim 1, wherein the four magnets each comprises four side surfaces, and
wherein one of the four side surfaces of each magnet faces the coil, and three of the four side surfaces of each magnet face the yoke.

10. The lens driving apparatus of claim 9, wherein the three side surfaces of each magnet facing the yoke are coupled to an inner surface of the yoke.

11. The lens driving apparatus of claim 1, wherein the upper spring is inserted into and coupled to a first support protrusion formed at the upper portion of the bobbin.

12. A camera comprising:
the lens driving apparatus as claimed in claim 1; and
a lens coupled to the bobbin of the lens driving apparatus.

13. An electronic appliance comprising the camera according to claim 12.

14. The camera of claim 12, wherein the coil comprises eight outer surfaces; and
wherein the four magnets face four outer surfaces of the eight outer surfaces of the coil, respectively.

15. The camera of claim 14, wherein each of the four magnets comprises four side surfaces; and
wherein one of the four side surfaces of each magnet faces the coil, and three of the four side surfaces of each magnet face the yoke.

16. The lens driving apparatus of claim 1, wherein the yoke comprises a metal yoke, and
wherein a step section is provided by the second side plate and the second upper plate of the metal yoke such that the step section of the yoke provides a space for movement of the intermediate portion of the upper spring.

17. The lens driving apparatus of claim 1, wherein the intermediate portion of the upper spring is configured to move to a position higher than the outer side of the upper spring.

18. The lens driving apparatus of claim 1, wherein, when viewed from the bottom, a shape of an inner surface of the yoke is a polygon.

19. The lens driving apparatus of claim 18, wherein the inner surface of the yoke comprises four corners,
wherein the four corners include a first corner, a second corner adjacent to the first corner, a third corner adjacent to the second corner and facing the first corner, and a fourth corner adjacent to the first and third corners and facing the second corner; and
wherein the four magnets comprise a first magnet disposed on the first corner, a second magnet disposed on the second corner, a third magnet disposed on the third corner, and a fourth magnet disposed on the fourth corner.

20. The lens driving apparatus of claim 19, wherein each of the four magnets has a prism shape,
wherein the coil has an octagonal shape, and
wherein each of the four magnets comprises at least two flat surfaces facing the yoke such that the at least two flat surfaces of each of the four magnets are coupled to an inner surface of the first side plate of the yoke.

* * * * *